(12) United States Patent
Wilks et al.

(10) Patent No.: US 7,895,102 B1
(45) Date of Patent: Feb. 22, 2011

(54) SYSTEMS AND METHODS FOR FINANCIAL PLAN BENCHMARKING

(75) Inventors: Bruce Wesley Wilks, San Antonio, TX (US); Robert Morales, Helotes, TX (US); Rennie Garcia, Helotes, TX (US); Robert Anthony Pacheco, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/040,082

(22) Filed: Feb. 29, 2008

(51) Int. Cl.
*G06Q 40/00* (2006.01)

(52) U.S. Cl. .............. 705/35; 705/36 R; 434/107; 434/362; 235/379; 715/760

(58) Field of Classification Search ............... 705/36, 705/43; 706/14; 715/810
See application file for complete search history.

(56) References Cited

U.S. PATENT DOCUMENTS

| | | | | |
|---|---|---|---|---|
| 4,837,693 | A * | 6/1989 | Schotz | 705/4 |
| 5,148,365 | A * | 9/1992 | Dembo | 705/36 R |
| 5,652,842 | A | 7/1997 | Siegrist et al. | |
| 5,794,224 | A * | 8/1998 | Yufik | 706/14 |
| 5,799,287 | A * | 8/1998 | Dembo | 705/36 R |
| 5,878,405 | A | 3/1999 | Grant et al. | |
| 6,012,044 | A * | 1/2000 | Maggioncalda et al. | 705/36 R |
| 6,021,397 | A | 2/2000 | Jones et al. | |
| 6,029,176 | A | 2/2000 | Cannon | |
| 6,055,517 | A | 4/2000 | Friend et al. | |
| 6,195,622 | B1 * | 2/2001 | Altschuler et al. | 703/2 |
| 6,219,650 | B1 | 4/2001 | Friend et al. | |
| 6,236,975 | B1 | 5/2001 | Boe et al. | |
| 6,260,025 | B1 * | 7/2001 | Silverman et al. | 705/37 |
| 6,278,981 | B1 * | 8/2001 | Dembo et al. | 705/36 R |
| 6,684,190 | B1 * | 1/2004 | Powers et al. | 705/36 R |
| 6,748,427 | B2 | 6/2004 | Drosset et al. | |
| 6,890,179 | B2 * | 5/2005 | Rogan et al. | 434/107 |
| 7,062,458 | B2 * | 6/2006 | Maggioncalda et al. | 705/36 R |
| 7,171,385 | B1 * | 1/2007 | Dembo et al. | 705/36 R |
| 7,212,988 | B1 | 5/2007 | Feldten | |
| 7,231,608 | B1 | 6/2007 | Fano et al. | |
| 7,401,040 | B2 | 7/2008 | Sloan et al. | |
| 7,546,246 | B1 * | 6/2009 | Stamm et al. | 705/7 |
| 7,577,597 | B1 * | 8/2009 | Allison et al. | 705/35 |

(Continued)

OTHER PUBLICATIONS

Finportfolio.com, Monte Carlo Simulation and Financial Planning, www.finportfolio.com/education/tutorial, 1999-2006 (MonteCarlo).*

(Continued)

*Primary Examiner*—Ella Colbert
*Assistant Examiner*—Chika Ojiaku
(74) *Attorney, Agent, or Firm*—Chadbourne & Parke, LLP; Walter G. Hanchuk (57) ABSTRACT

A comprehensive set of data pertaining to a user is gathered from various sources and analyzed. A financial plan is generated and provided to the user. The user may set financial goals and monitor progress towards achieving the goals, and may set and monitor probabilities of success of achieving the goals. The financial plan may take into account the financial goals and probabilities of success, and may be revised to reflect changes in the financial goals and probabilities of success. In an implementation, a user may be provided with information pertaining to how their finances, financial plan, goals, and probabilities of success compare to a selected population group.

15 Claims, 6 Drawing Sheets

U.S. PATENT DOCUMENTS

| | | | |
|---|---|---|---|
| 7,627,512 | B2 * | 12/2009 | Harris et al. ............... 705/36 T |
| 7,689,682 | B1 | 3/2010 | Eldering et al. |
| 7,756,770 | B2 * | 7/2010 | Dembo et al. ............. 705/36 R |
| 7,797,208 | B2 * | 9/2010 | Thomas ........................ 705/35 |
| 7,797,219 | B1 * | 9/2010 | Wright et al. ............. 705/36 R |
| 2001/0011243 | A1 * | 8/2001 | Dembo et al. .................. 705/36 |
| 2001/0027455 | A1 | 10/2001 | Abulleil et al. |
| 2002/0032602 | A1 | 3/2002 | Lanzillo et al. |
| 2002/0073005 | A1 * | 6/2002 | Welnicki et al. ............. 705/35 |
| 2002/0123947 | A1 * | 9/2002 | Yuste et al. ................... 705/35 |
| 2002/0138386 | A1 * | 9/2002 | Maggioncalda et al. ....... 705/36 |
| 2002/0152088 | A1 * | 10/2002 | Hogan ........................... 705/1 |
| 2002/0161609 | A1 | 10/2002 | Zizzamia et al. |
| 2002/0174049 | A1 * | 11/2002 | Kitahara ....................... 705/36 |
| 2002/0184069 | A1 * | 12/2002 | Kosiba et al. .................... 705/8 |
| 2002/0194113 | A1 * | 12/2002 | Lof et al. ....................... 705/37 |
| 2002/0198760 | A1 | 12/2002 | Carpenter et al. |
| 2003/0018506 | A1 * | 1/2003 | McLean et al. ................. 705/7 |
| 2003/0028466 | A1 * | 2/2003 | Jenson et al. ................. 705/36 |
| 2003/0033229 | A1 * | 2/2003 | Keyes et al. .................. 705/36 |
| 2003/0074211 | A1 | 4/2003 | Lun |
| 2003/0097324 | A1 | 5/2003 | Speckman |
| 2003/0101449 | A1 * | 5/2003 | Bentolila et al. .............. 725/10 |
| 2003/0101451 | A1 * | 5/2003 | Bentolila et al. .............. 725/34 |
| 2003/0126054 | A1 * | 7/2003 | Purcell, Jr. .................... 705/36 |
| 2003/0144936 | A1 * | 7/2003 | Sloan et al. ................... 705/36 |
| 2004/0010393 | A1 | 1/2004 | Barney |
| 2004/0010772 | A1 * | 1/2004 | McKenna et al. ........... 717/101 |
| 2004/0033475 | A1 * | 2/2004 | Mizuma et al. ............. 434/219 |
| 2004/0067469 | A1 * | 4/2004 | Rogan et al. ................. 434/107 |
| 2004/0068429 | A1 * | 4/2004 | MacDonald .................. 705/10 |
| 2004/0068432 | A1 * | 4/2004 | Meyerkopf et al. ........... 705/11 |
| 2004/0103052 | A1 * | 5/2004 | Eapen ........................... 705/36 |
| 2004/0138897 | A1 * | 7/2004 | Eapen ............................. 705/1 |
| 2004/0167847 | A1 * | 8/2004 | Nathan .......................... 705/37 |
| 2004/0177010 | A1 | 9/2004 | Francis |
| 2004/0236623 | A1 | 11/2004 | Gopalakrishnan |
| 2005/0004855 | A1 * | 1/2005 | Jenson et al. .................. 705/35 |
| 2005/0075916 | A1 * | 4/2005 | Lathram et al. ................. 705/7 |
| 2005/0102209 | A1 * | 5/2005 | Sagrillo et al. ................ 705/35 |
| 2005/0119922 | A1 * | 6/2005 | Eder .............................. 705/7 |
| 2005/0137953 | A1 * | 6/2005 | McDonough et al. ......... 705/36 |
| 2005/0177416 | A1 * | 8/2005 | Linden ......................... 705/14 |
| 2005/0228622 | A1 * | 10/2005 | Jacobi ............................ 703/2 |
| 2005/0234742 | A1 | 10/2005 | Hodgdon |
| 2006/0074788 | A1 * | 4/2006 | Grizack et al. ................. 705/35 |
| 2006/0122873 | A1 * | 6/2006 | Minotto ......................... 705/7 |
| 2006/0184448 | A1 * | 8/2006 | Polston et al. ................ 705/37 |
| 2006/0218068 | A1 * | 9/2006 | Loeper ......................... 705/35 |
| 2006/0241989 | A1 * | 10/2006 | Walters et al. .................. 705/7 |
| 2007/0050276 | A1 | 3/2007 | Mannion |
| 2007/0055602 | A1 | 3/2007 | Mohn |
| 2007/0124227 | A1 * | 5/2007 | Dembo et al. ............. 705/36 R |
| 2008/0027769 | A1 * | 1/2008 | Eder ............................. 705/7 |
| 2008/0091510 | A1 | 4/2008 | Crandall et al. |
| 2008/0201269 | A1 | 8/2008 | Hollins et al. |
| 2008/0255993 | A1 * | 10/2008 | Blinbaum .................... 705/44 |
| 2009/0144128 | A1 * | 6/2009 | Polston et al. ................ 705/10 |
| 2009/0307088 | A1 * | 12/2009 | Littlejohn ................ 705/14.53 |
| 2010/0100469 | A1 | 4/2010 | Buchanan et al. |

OTHER PUBLICATIONS

Christopher Farrell, A Better Way to Size Up Your Nest Egg, Bloomberg Businessweek Online, Jan. 22, 2001 (BWeek).*

MWBoone and Associates, "MWBoone & Associate's WealthVision"; Retrieved from the internet <URL: http://store.mwboone.com/mwwe.html>, Copyright © 2007 MWBoone and Associates All Rights Reserved.

Whiting, Rick; "Moving Closer To Real-Time Financial Planning—Adaytum and Comshare emphasize collaboration in new financial-planning applications." InformationWeek, May 13, 2002 12:00 AM. Copyright © 2007 CMP Media LLC.

First Allied, "Technology—Innovative Technology; iStation: Intelligence at Work", Retrieved from the internet <URL: http://www.joinfasi.com/technology.php>. © 2008 Advanced Equities, Inc.

Matthews, Jayson, "Real Time Financial Planning"; siliconvalley.internet.com, Nov. 8, 2000. Retrieved from the internet <URL: http://siliconvalley.internet.com/news/article.php/506771>. Copyright 2008 Jupitermedia Corporation All Rights Reserved.

Tycor Companies, "Cover Story-The Tycor Companies-Tycor Benefit Administrators, Inc. and Tycor Asset Management, Inc.(r)." Retrieved from the internet <URL: http://www2.422business.com/articles/200512/TheTycorCompan.html>.

Kim, Jinhee; "The Effected of Workplace Financial Education on Personal Finances and Work Outcomes, Chapter II. Review of Related Literature"; Apr. 2000; pp. 13-103; Blacksburg, Virginia.

Bae, Sung C. and Sandager, James P.; "What Consumers Look For In Financial Planners"; Financial Counseling and Planning; 1997; pp. 9-16; vol. 8, Issue 2.

Rojas, Stephen J.; "Developing a Basis for Personal Financial Planning Recommendations: The CPAs' Responsibilities"; pp. 1-3.

Four Seasons Financial Planning; "About Us"; [Retrieved on Jan. 28, 2008]; Retrieved from the internet <URL:http://www.fourseasonsfp.co.uk/aboutus.asp>.

Folk Financial Planning; "Financial Planning"; [Retrieved on Jan. 28, 2008]; Retrieved from the internet <URL:http://www.karenfolk.com/#planning>.

Madnick, Stuart and Siegel, Michael; "Seizing the Opportunity: Exploiting Web Aggregation"; MIT Sloan Working Paper No. 4351-01; Dec. 2001; pp. 1-15.

Teknowledge Corporation; "Tekportal Account Aggregation"; [Retrieved on Jan. 28, 2008]; Retrieved from the internet URL:http://www.teknowledge.com/fs/tekportal/aggregation.htm.

Lapide, Larry, "Sales and Operations Planning Part II: Enabling Technology"—The Journal of Business Forecasting, Winter 2004-05. 3 pages (pp. 18-20).

Oracle, "Oracle and Hyperion", Retrieved from the internet <http://www.oracle.com/hyperion/index.html>, pp. 1-4, Oracle Corporation.

Mr. Dashboard—business metrics, Retrieved from the internet <http://www.mrdashboard.com>, Copyright 2007 Mr. Dashboard. All rights reserved.

Budgets Get Real—personal money management software, Retrieved from the internet <http://budgetsgetreal.com/>, pp. 1-5, © 2005-2007 Informed Choices Pty Ltd.

Paradigm Analytics—The ability to solve for X, Business Intelligence and Performance Management, Retrieved from the internet: <http://www.paradigmanalytics.com/>.

Schmerken, Ivy—"Advisors Tool Up for Wealth Management—The Big Picture", Wall Street & Technology, Apr. 8, 2002, pp. 1-7, Copyright® 2008 United Business Media LLC.

Moving.com, "Home & Garden Tips—Interview with a Financial Planner", Retrieved from the internet <http://www.moving.com/Mortgage_and_Finance/MAI_Article/FinancialPlanner.asp>, pp. 1-3, Copyright © 2000-2008 Move, Inc.

O'Neill, Barbara O'Neill, Xiao, Jing J., Bristow, Barbara, Brennan, Patricia Brennan and Kerbel, Claudia M.; "Successful Financial Goal Attainment: Perceived Resources and Obstacles"; Financial Counseling and Planning; 2000; pp. 1-12; vol. 11, Issue 1.

Rojas, Stephen J.; "Putting Financial Strategies into Action: Implementing, Monitoring and Updating a Client's Personal Financial Planning Strategies"; pp. 1-7.

Kozak Financial Advisory; "Our Services"; [Retrieved on Jan. 28, 2008]; Retrieved from the internet <URL:http://www.kozakfinancial.com/whatwedo.asp?SPID=57313&Title=Our+Services&OrgID=1914>.

MBA Services Financial Planning; "Introduction to Financial Planning: It is a journey, not a destination."; [Retrieved on Jan. 28, 2008]; Retrieved from the internet <URL:http://www.medicalbusinessadvisors.com/services-financial.asp>; Medical Business Advisors, Inc.; Atlanta, Georgia.

Ten Haagen Financial Group; "Published Articles: The Importance Of A Financial Checkup"; [Retrieved on Jan. 28, 2008]; Retrieved from the internet <URL:http://www.tenhaagen.com/section4.cfm>.

* cited by examiner

SYSTEMS AND METHODS FOR FINANCIAL PLAN BENCHMARKING

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/040,097, and U.S. patent application Ser. No. 12/040,112, each filed on Feb. 29, 2008 and each entitled "Systems And Methods For Financial Plan Benchmarking"

BACKGROUND

Financial planners try to determine how their clients can meet financial goals through management of resources. They examine the financial history of their client's assets and develop a financial plan the client should take to meet their goals. The financial plan is based on a client's financial situation at one point in time. However, financial planning is data-heavy that constantly changes. Financial planners are not able to continuously monitor a client's financial situation and revise the financial plan accordingly. Delays in receiving updated client data lead to delays in revising financial plans.

SUMMARY

A comprehensive set of data pertaining to a user is gathered from various sources and analyzed. A financial plan, comprising financial advice and/or recommendations for example, is generated and provided to the user. The user may set financial goals and monitor progress towards achieving the goals. The user may set and monitor probabilities of success of achieving the goals. The financial plan may take into account the financial goals and probabilities of success, and may be revised to reflect changes in the financial goals and probabilities of success. Additionally, the data underlying the financial plan is continuously monitored for changes or updates, and the financial plan may be revised to reflect the changes or updates to the data.

In an implementation, a user may be provided with information pertaining to how their finances, financial plan, goals, and probabilities of success compare to a selected population group.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
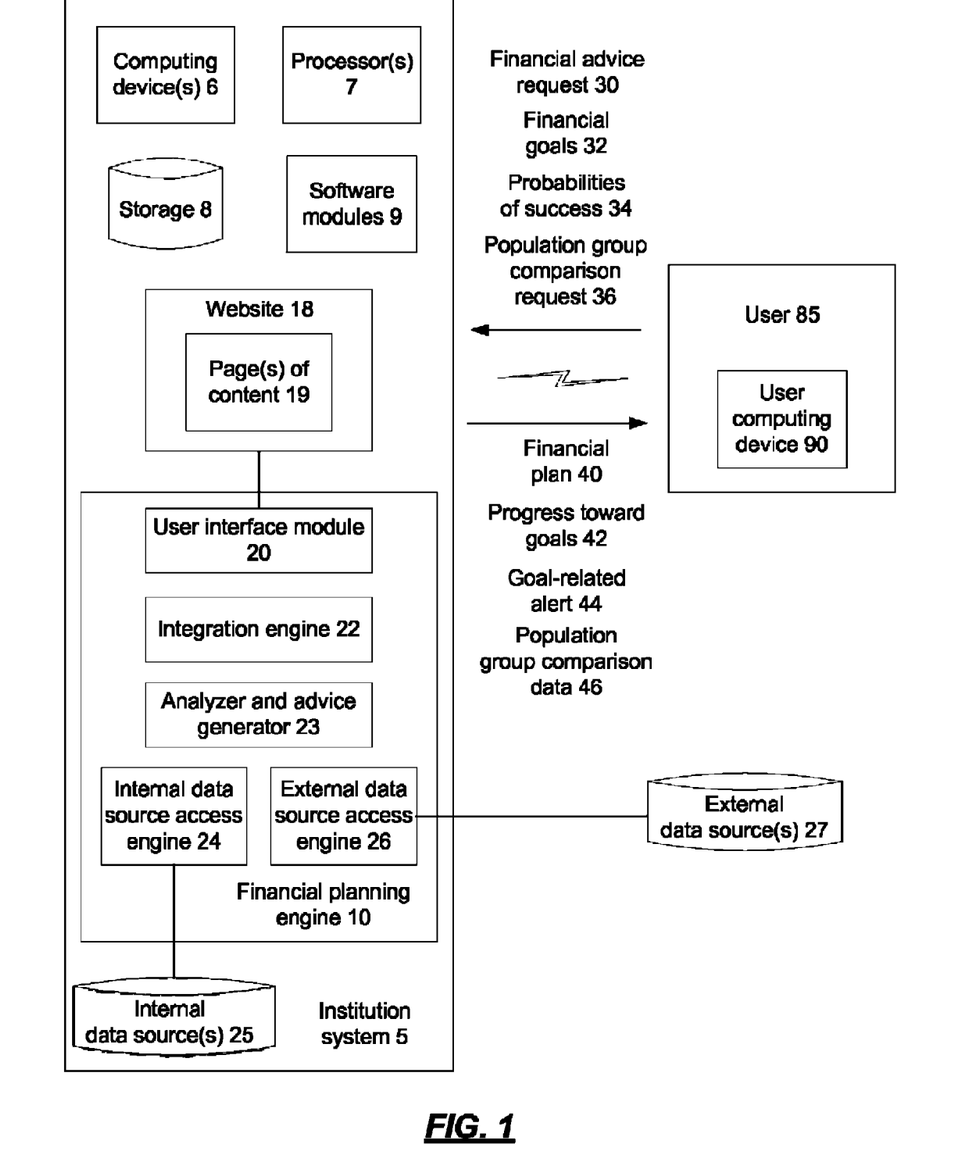
FIG. 1 is a block diagram of an implementation of a system that may be used to dynamically generate and provide financial advice and financial plan benchmarking.

FIG. 1 is a block diagram of an implementation of a system that may be used to dynamically generate and provide financial advice and financial plan benchmarking. An institution system 5, associated with or otherwise maintained by an institution such as a financial services institution, may include a financial planning engine 10. The financial planning engine 10 may receive a financial advice request 30 from a user 85 via a user computing device 90, and may provide a financial plan 40, comprising financial advice and/or recommendations for example, to the user 85 via the user computing device 90. An example user computing device 90 is described with respect to FIG. 6.

The financial planning engine 10 may also receive a financial goals 32 and/or probabilities of success 34 from the user 85, and provide information relating to the user's progress toward the goals 42 and goal-related alerts 44, described further herein. In an implementation, the financial planning engine 10 may receive a population group comparison request 36 from the user 85 and provide population group comparison data 46 in response. Such use of goals, goal-related alert, and population group comparison may be considered to be types of benchmarking.

The financial planning engine 10 may include a user interface module 20, an integration engine 22, an analyzer and advice generator 23, an internal data source access engine 24, and an external data source access engine 26. The user interface module 20 may generate and format one or more pages of content 19 as a unified graphical presentation that may be provided to the user computing device 90 as an output from the financial planning engine 10. The page(s) of content 19 may be provided to the user computing device 90 via a website 18 associated with the institution system 5.

The integration engine 22 provides the financial planning engine 10 the ability to retrieve information from one or more internal data sources 25 and one or more external data sources 27 concurrently, in an implementation, via an internal data source access engine 24 and an external data source access engine 26, respectively. Data pertaining to the user 85 may be retrieved from internal data source(s) 25 as well as external data source(s) 27. Additionally, data pertaining to other users and population groups may be retrieved from internal data source(s) 25 as well as external data source(s) 27. The retrieved data may be stored centrally, perhaps in storage associated with the institution system 5, such as storage 8.

Internal data source(s) 25 may contain data that the institution system 5 maintains pertaining to the user 85 and to other users and population groups, such as personal data or life events such as marital status and age, as well as financial data such as account balances, outstanding loans, credit card debt, etc. For instance, the user 85 may have a checking account, a credit card and an auto loan with the institution system 5, and this information may be retrieved and used by the financial planning engine 10.

External data source(s) 27 may contain additional data pertaining to the user and to other users and population groups, such as additional personal data and/or financial data. External data source(s) 27 may be associated with one or more entities that may be independent of each other. Each of the external data source(s) 27 may be a computer system that maintains financial information or financial accounts of the user 85, other users, and population groups that is not maintained by the institution system 5. It is contemplated that any number of external data sources may be in communication with the institution system 5 and may provide any type of data associated with users and population groups thereto.

In an implementation, external data source(s) 27 may include credit cards, financial institutions, financial software applications, and public databases. The external data source(s) 27 may be in communication with the institution system 5 via a network, such as the Internet. Additional example sources of data may include bank accounts, retirement accounts, financial software applications, brokerage accounts, mutual funds, annuities, certificates of deposits, and investment accounts, for example, along with publicly available information. For example, data from investment and retirement accounts might include mutual funds, bonds, etc. and may be acquired and used in subsequent calculations and analysis.

The integration engine 22 may receive user information and population group information from the internal and external data source access engines 24 and 26 and may provide that information to the analyzer and advice generator 23. The analyzer and advice generator 23 may use tools, calculators, applications, and aggregators, for example to generate a financial plan 40, monitor a user's progress towards goals, and determine how a user's financial situation compares with that of a particular population group. In an implementation, the analyzer and advice generator 23 may include one or more of a portfolio planner, a financial assessment tool, a budget generating tool, an asset allocation tool, a life insurance determination calculator, a retirement advice generator, bank calculators, debt analyzers, retirement income planners, etc. The analyzer and advice generator 23 may evaluate the user information (e.g., the personal information and the financial information pertaining to the user) and generate a financial plan 40 that may comprise financial advice and/or recommendations for the user 85.

The output of the analyzer and advice generator 23 may include budgeting and retirement advice. For example, recommendations and strategies may be generated that are directed to income in retirement (e.g., monthly or annually in present year dollars), income for shortfall or surplus, income distribution, pre-retirement savings, asset allocation recommendations, asset withdrawal strategies, and recommendations for re-allocation from wealth building to income generating. Additionally, specific product recommendations may be provided along with a list of suitable products for user consideration, for example. The output of the analyzer and advice generator 23 may also include information pertaining to a user's progress with respect to financial goals, and information pertaining to a user's financial situation as compared with a particular population group.

In an implementation, the financial plan 40, along with its financial advice and recommendations, and/or progress towards goals 42, a goal-related alert 44, and/or population group data, may be integrated into a single unified presentation, which may then be sent to the user interface module 20 for presentation to the user 85. Through this mechanism, the user 85 may quickly see the financial plan 40 that has been generated for them, see their progress towards their financial goals, learn of any alerts regarding their financial goals, and see how their financial situation compares to a particular population group which the user may select. Thus, in an implementation, a financial plan 40 and a user's progress toward goals 42 may be provided online, e.g. via the website 18, to the user 85 and as described further herein, may be updated continuously or periodically by the institution system 5. Also provided online may be a goal-related alert 44 and population group comparison data 46.

The user 85 may interface with the institution system 5 via the website 18 that may display one or more pages of content 19 to the user 85 on the user computing device 90. A financial advice request 30 or population group comparison request 36 may be received at the institution system 5 through any suitable means, such as interaction with a web browser that is in communication with a financial advice server or other computing device within the institution system 5. The actual mechanism of connection is outside the scope of the present discussion. As described further herein, financial goals 32 and probabilities of success 34 may also be received at the institution system 5 through similar means.

The financial advice request 30 may be processed by the financial planning engine 10, which then provides the user 85 with a financial plan 40. In an implementation, the user 85 may be provided with advice, recommendations and/or a plan directed to asset management, estate planning, insurance, investments, and retirement, for example. The financial plan 40 may comprise a set of recommendations and strategies for the user 85 to use. The recommendations may include recommendations to purchase one or more products or services from the institution system or another institution.

The financial plan 40 may also comprise a financial profile for the user 85 who may use it to create and maintain financial information about the user 85. The financial profile may include income, assets, liabilities, and social security and pension information, for example. The institution system 5 may continuously (on a real-time basis) or periodically (repeatedly over a period of time) monitor the user's data, the financial profile, and the user's implementation of recommendations set forth in the financial plan 40, and revise the financial plan 40 accordingly. In this manner, real-time or periodic updates to the financial plan 40 may be provided to the user 85.

The financial planning engine 10 may provide a questionnaire to the user 85 that requests information from the user 85 such as goals, probabilities of success of attaining the goals that the user would like to use or would be comfortable with, financial objectives, current income, investments, risk tolerance, expenses, tax returns, insurance coverage, retirement programs, estate plans, and other pertinent information that may be used to generate a financial plan 40 that meets the user's overall or specific financial agenda. The questionnaire may be pre-filled or personalized with data already known to the institution system 5 pertaining to the user 85, perhaps from existing accounts that the user has with the institution system 5. The institution system 5 may generate a financial plan 40 based at least in part on the questionnaire.

The user computing device 90 may provide user access to a system which is coupled to the financial planning engine 10 and is configured to receive a plurality of user requests, at least one of which is a financial advice request 30. A system may be configured to format and transmit a graphical user interface to user 85, and through the graphical user interface provide the user 85 the ability to interact with and manipulate the financial advice, recommendations, and/or financial plan provided by the institution system 5.

A user access system may be communicatively coupled to the financial planning engine 10 and may be configured to send machine-readable instructions to the financial planning engine 10. Those instructions may cause the financial planning engine 10 to access one or more internal and one or more external data sources 25 and 27, respectively.

As mentioned above, the financial planning engine 10 may provide a unified graphical presentation output. The unified graphical presentation may be transmitted to the user access system. In an implementation, the unified graphical presentation is combined with other materials and transmitted to the user 85. In an implementation, the unified graphical presentation is received by the user access system and transmitted directly to the user 85 without the inclusion of any other materials.

The user access system may be implemented as a web server in an implementation. The user access system, through the use of any suitable interactive web technology, provides an interactive experience to the user 85 through which access to and maintenance of their financial advice, recommendations, and/or financial plan can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

In an implementation, the institution may be a financial services institution having a financial services website. On the website, in a common space, the user may be presented with financial advice, recommendations, progress toward goals, alerts, population group comparison data, and/or a financial plan.

The institution system 5 may comprise one or more computing devices 6. A user computing device 90 may allow a user 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user 85 may be stored in storage 8 or other storage such as one or more internal data sources 25, for example.

Examples of software modules 9 may include modules for identifying and authenticating a user, generating a questionnaire, generating web page content for display, and receiving instructions from a user, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

Figure 2:
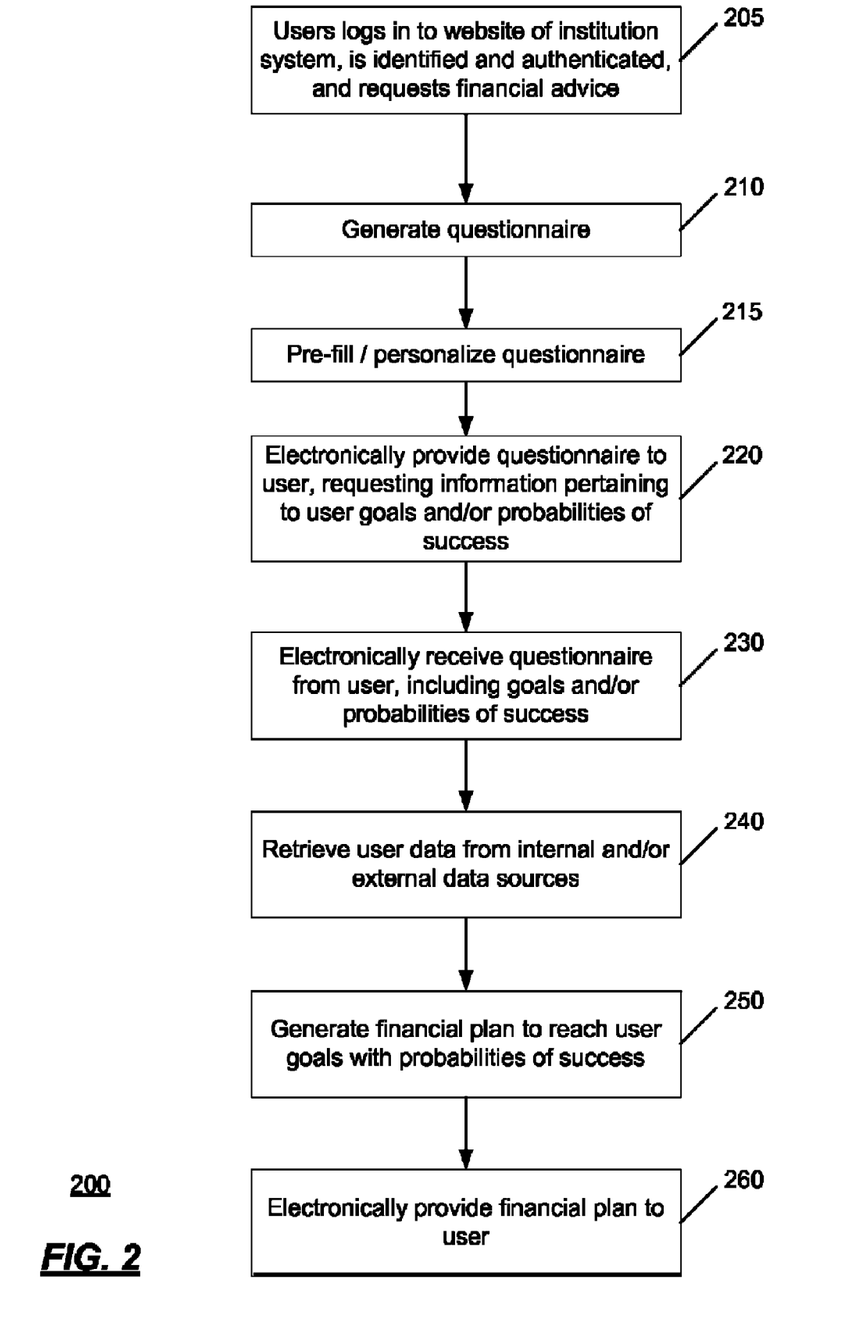
FIG. 2 is an operational flow of an implementation of a method of electronically generating and providing financial advice and goals.

FIG. 2 is an operational flow of an implementation of a method 200 of electronically generating and providing financial advice and goals. At operation 205, a user may log into a website associated with the institution system, may be identified and authenticated using any known techniques, and may request financial advice.

At operation 210, a questionnaire may be generated or retrieved from storage associated with the institution system. The questionnaire may request information from the user including goals and probabilities of success that may be analyzed and used to generate a financial plan comprising financial advice, goals, and/or recommendations, for example. Prior to providing the questionnaire to the user, the questionnaire may be pre-filled or personalized with data that is known to the institution system about the user, such as the user's name, address, and social security number, at operation 215. This information may be retrieved from storage associated with the institution system.

At operation 220, the questionnaire may be electronically provided to the user via the website or email, for example. The user may then fill out the questionnaire, responding to any questions or requests for information contained in the questionnaire. The questionnaire may contain questions or requests for information directed to the user's financial goals, such as goals directed to retirement, savings, educational savings, debt, insurance, home ownership, etc. The questionnaire may also request that the user prioritize their goals (e.g., the user may indicate that the goal of having enough assets in retirement is a higher priority than the goal of having a certain amount of insurance or paying off a mortgage by a certain age). The questionnaire may also contain questions or requests for information directed to the user's tolerance for risk and the user's desired probabilities of success for reaching each of the goals. For example, the user may want to have (e.g., may be comfortable with) a 95% probability of success of saving enough for retirement at age 65, and want to have (e.g., may be comfortable with) only a 60% probability of success of being able to save enough to pay for a college education for their children.

The user may electronically provide the filled out questionnaire back to the institution system, at operation 230. The user may provide the questionnaire via the website, email, or any other electronic means.

At operation 240, the institution system retrieves the user's personal and financial information from various internal and external data sources. For example, the user may maintain bank accounts, credit cards, loans, and insurance with the institution system, and this information may be retrieved from the institution system's storage. Additional account, asset, liability, and other information may be maintained by one or more entities external to the institution system, and this information may be retrieved as well. In an implementation, the user may provide the institution system with authorization and/or access instructions to access the information from the external data sources.

At operation 250, an analyzer and advice generator associated with the institution system may receive and analyze the information pertaining to the user that was obtained from the questionnaire as well as from the internal and external data sources. The analyzer and advice generator may be an application that receives the information, analyzes the information, and generates a financial plan with advice, goals, and/or recommendations that is tailored to the user, in one or more of the areas of investment planning, retirement planning, tax planning, estate planning, and risk management, for example. The financial plan, with financial advice, goals, and/or recommendations, may be electronically provided to the user, via a website or email, for example, at operation 260.

In an implementation, the financial plan takes into account the user-provided probabilities of success for each of the goals identified by the user. In another implementation, the financial plan indicates the probabilities of success for reaching each of the goals, regardless of whether or not the user provided any probabilities of success for each of the goals. It is contemplated that the user may make modifications to the plan or otherwise provide feedback to the institution system, and the plan may be modified accordingly.

Figure 3:
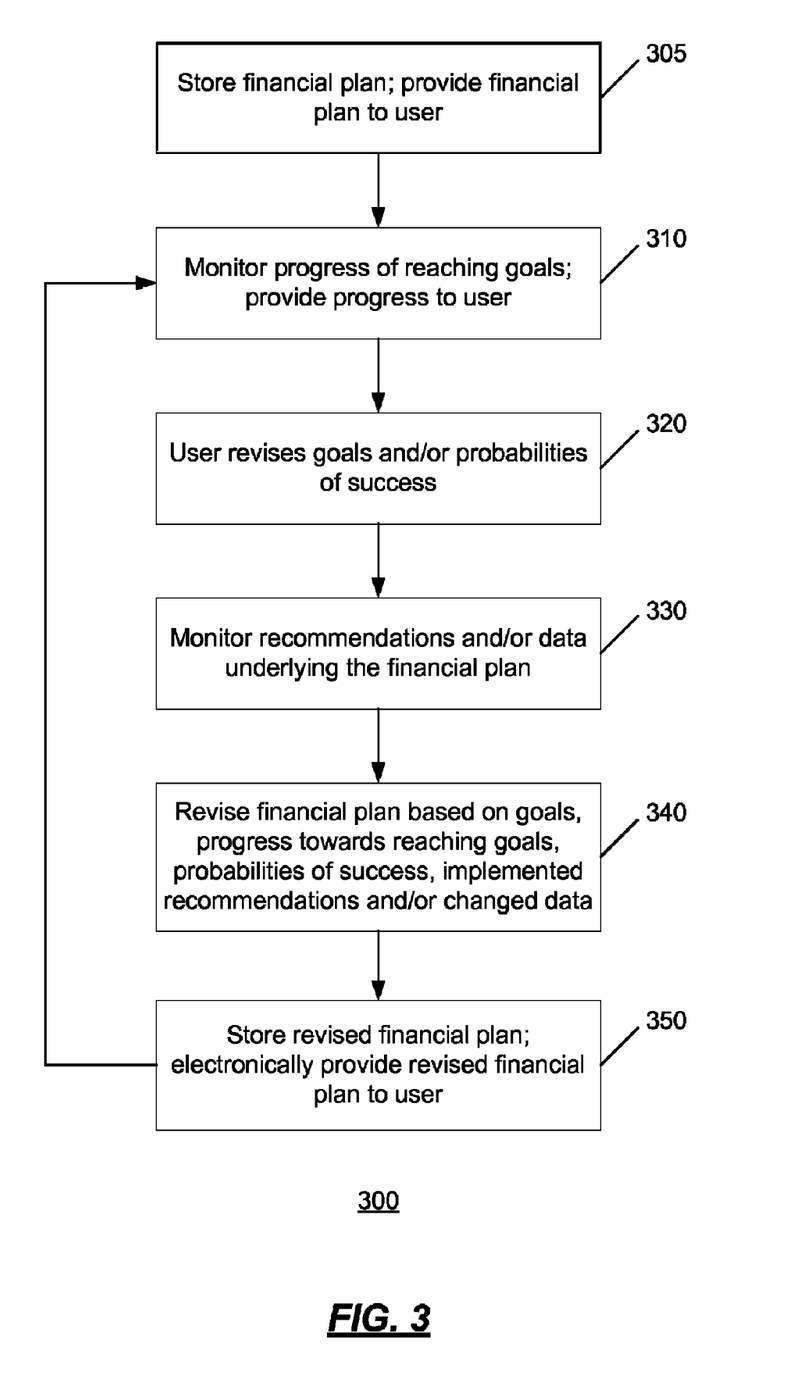
FIG. 3 is an operational flow of an implementation of a financial planning method involving goals.

FIG. 3 is an operational flow of an implementation of a financial planning method 300 involving goals. At operation 305, a financial plan that has been generated for a user may be stored in storage and provided to the user, such as via a website or email for example.

At operation 310, a user's progress towards meeting the goals that the user had established and that have been incorporated into the financial plan is generated by the institution system and provided to the user. The progress may be provided in a report that is sent to the user by email or fax for example, or may be provided on a website or via a link to a website for example. The progress may be indicated by a score, a percentage, a chart, graph or diagram, and/or any other means of providing an indication. The progress may be monitored and updated continuously in real-time or periodically, such as daily, weekly, or monthly for example. In this manner, a user may monitor their up-to-date progress whenever they like and as often as they like. Historical progress may be maintained and provided. In this manner, a user may get a representation of how they have progressed with respect to their goals over time. In an implementation, if the user is on track for meeting the goals, the progress may indicate so and advise the user that no changes in the user's current actions are recommended.

At some point, at operation 320, the user may revise the goals, the priorities associated with the goals, and/or the desired probabilities of success associated with the goals that had been incorporated into the financial plan. In an implementation, the user may access a website associated with the institution system, view the goals and indicated probabilities of success that the user had earlier provided, and modify the goals and/or probabilities of success. The institution system may then learn of these modifications, e.g., when the user saves the modifications. Alternatively, the user may access a questionnaire that asks the user about goals and probabilities of success. The user may provide this information which is then accessible by the institution system.

It is contemplated that a user may consider and amend the goals online (e.g., via a website accessible from a computing device, such as a personal computer, a personal digital assistant, or mobile phone), or in a telephone virtual menu with touch keypad or voice prompts that may include intelligent voice recognition, for example. Settings and options for the features described herein may be implemented as drop-down lists or radio buttons, for example.

The institution system (e.g., a financial planning engine associated with the institution system) continuously monitors whether any of the recommendations that had been provided to the user are acted on by the user, at operation 330. For example, the institution system may check the internal and external data sources continuously or periodically (e.g., hourly, daily, at a predetermined time and day of the week, etc.) to determine if any action has been taken by the user that is directed to the previously provided recommendations.

The institution system also continuously monitors the user data in the internal and external data sources, at operation 330. For example, a financial planning engine may check the internal and external data sources continuously or periodically (e.g., hourly, daily, at a predetermined time and day of the week, etc.) to determine if any personal or financial data pertaining to the user has been changed since the most recent financial plan had been generated and provided to the user. Thus, life events pertaining to the user may be monitored. For example, the marital status or number of children of the user may change, the user may have a change in job or salary, or may have an increase in assets or liabilities. In an implementation, the institution system may contact the user, via email or telephone for example, and request information from the user regarding any action that the user may have taken pursuant to the financial plan, or any data pertaining to the user that may have changed that may affect the financial plan.

In an implementation, the institution system may provide a financial profile to the user who may update it as they take any action based on the financial plan, if their personal or financial information changes, as their financial goals change, or as the desired probabilities of success of their goals change. The financial profile may be stored in storage that is accessible to the institution system and the institution system may continuously or periodically monitor the financial profile to determine if any recommendations in the financial plan have been acted on, if any data that is pertinent to the financial plan may have changed, or if the financial goals or desired probabilities have changed. The institution system may send a request to the user from time to time, via email or telephone for example, requesting that the user update the financial profile.

If it is determined that a recommendation has been acted on, the data has changed, the goals have changed, or the desired probabilities of success have changed, the financial plan that had been previously generated and provided to the user may be revised at operation 340 accordingly. Alternatively, the financial plan may be revised without the user revising the goals and/or probabilities of success. Instead, the financial plan may be revised based on the progress that the user has made towards reaching the goals.

The revised financial plan may be stored in storage associated with the institution system and electronically provided to the user, via a website or email for example, at operation 350. The financial plan, data, goals, and recommendations may be monitored and updated or revised based on the monitoring. Because the monitoring is continuous, either in realtime or periodically as determined by the institution system for example, processing continues at operation 310.

Figure 4:
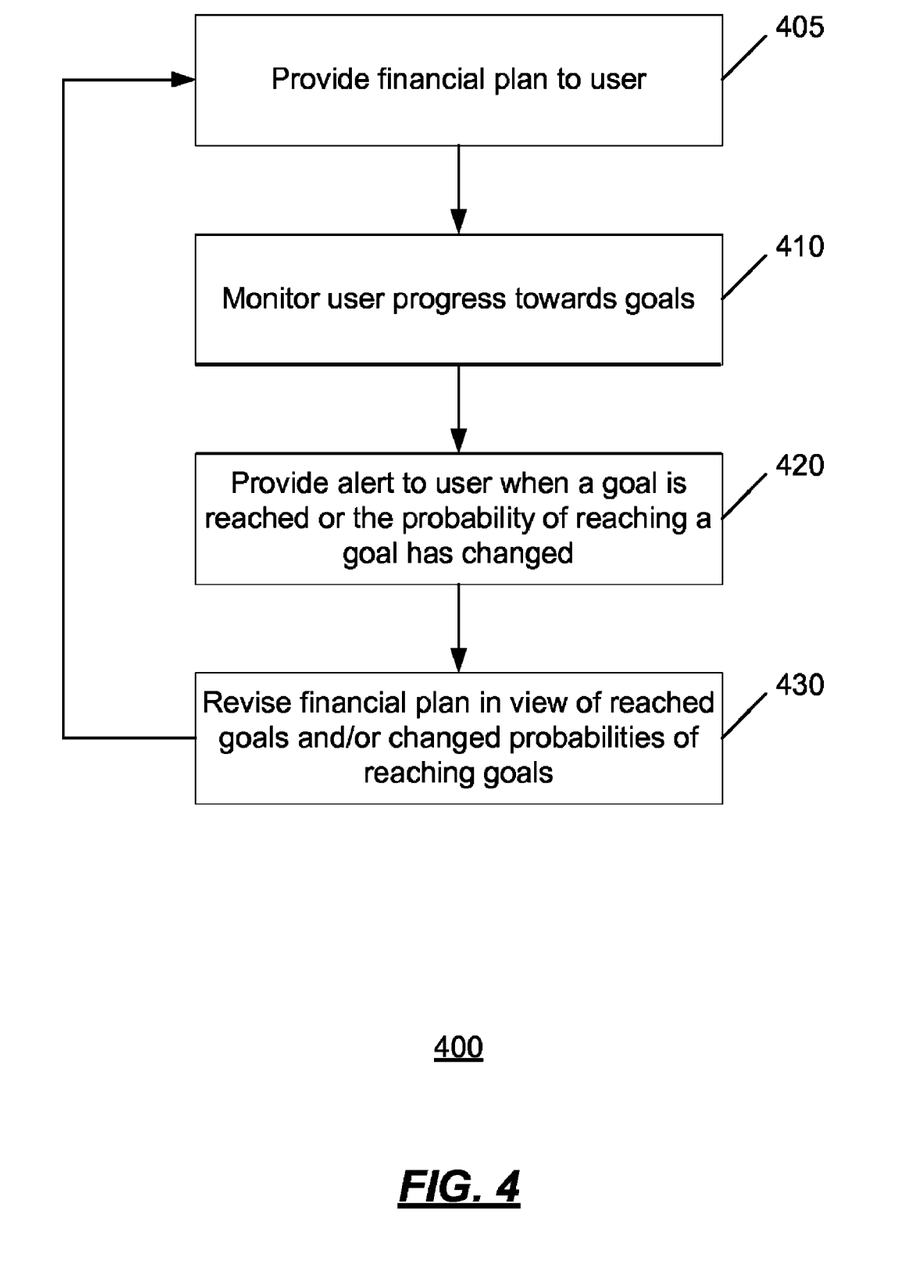
FIG. 4 is an operational flow of an implementation of another financial planning method involving goals.

FIG. 4 is an operational flow of an implementation of another financial planning method 400 involving goals. At operation 405, a financial plan is sent to a user. One or more recommendations pertaining to the financial plan and/or financial goals may also be sent to the user. The user may also be provided with the probabilities of success of meeting the financial goals if the recommendations are followed. The user may have selected these probabilities of success previously, when providing information to the institution system prior the financial plan being generated. Such recommendations may include suggestions to purchase a certain amount of insurance, investigate certain financial areas, save certain amounts, open certain financial accounts, diversify assets, reduce certain areas of debt, etc. These recommendations may be generated in response to the financial plan and may further the goals of the financial plan.

At some point, the user takes some action, such as implementing one or more of the recommendations that had been provided in the financial plan by the institution system, or taking some other action that may not have been recommended, such as making a large purchase (e.g., over a certain dollar amount), taking out a loan, moving assets from an account, etc. Because the institution system continuously monitors whether any of the recommendations that had been provided to the user are acted on by the user, and also monitors the user data that may pertain to a financial plan, the institution system may be made aware of action taken by the user.

At operation 410, the user's progress towards the goals is monitored by the institution system (e.g., by a financial planning engine associated with the institution system). In an implementation, the financial planning engine may check the internal and external data sources continuously or periodically (e.g., hourly, daily, at a predetermined time and day of the week, etc.) to determine if any action has been taken by the user that may affect the goals, or if any underlying data has changed that may affect the goals. For example, it may be determined if a goal has been met or if a goal is becoming less probable to be met based on the user's actions or data that the goals and/or recommendations may be based on.

In an implementation, it is determined whether the action taken by the user is contradictory to any of the goals set in the financial plan. For example, the financial plan may state that a goal is that assets should be increased in a savings account, and the action taken by the user may decrease assets in the savings account, thereby being contradictory to the goal. As another example, the financial plan may recommend that credit card debt be reduced. If the user increases the credit card debt, this action is determined to be contradictory to the goal. In such cases, it may be determined that the probability of meeting the goal has changed (e.g., decreased).

At operation 420, if a goal is met or if it is determined that the probability of meeting a goal has changed, then the user is notified, e.g., by sending an alert to the user. An alert may be in the form of an email, fax, or telephone call from the institution system or a service representative associated with the institution system for example. Alternatively or additionally, an alert may take the form of an indicator on a financial plan that is subsequently provided to the user and/or an indicator that is on a webpage that the user may access. The indicator may take the form of a flag, highlighting, text, or any other means of attracting attention.

If it is determined that a goal has been reached or that the probability of successfully reaching one or more goals has changed, then the financial plan that had been previously generated and provided to the user may be revised at operation 430 accordingly. Processing may continue at operation 405, with the revised financial plan being provided to the user.

In an implementation, a financial goal may be set by the user or the generated financial plan, and an alert or indicator may be provided to user when their actions may interfere with reaching the goal (e.g., when spending in certain areas or categories may interfere with reaching the goal).

Alternately or additionally, an alert or other indicator may be provided to the user when a particular aspect (e.g., spending in a category) becomes, or may become, inconsistent with the plan and its goals. A user who wants to plan ahead financially may for example, in a certain month set financial goals in spending habits and have alerts sent to him or her when certain predetermined thresholds related to the set financial goals are breached. Other goals may be longer term, such as saving money for college tuition, buying a car or home, or taking a vacation.

Thus, intelligent electronic goal feedback may be provided. Alerts on exceeded goals may be sent via email, text message, or fax, for example, or displayed on a web page, or provided by automated phone call, for example. As an example, a user may set a monthly spending limit on fast food, and if that limit is exceeded as determined by the system's monitoring, the user receives a text message or phone call saying that they have exceeded the goal for fast food spending and that it is recommended that the user stop spending on fast food for the remainder of the budget period (e.g., the remainder of the month).

In another embodiment, an alert may be triggered when the user is within a certain predetermined amount of the threshold, e.g., when the user is $15 away from exceeding the goal in a category.

Regarding categorization, the institution system may analyze and categorize each data item it receives from the internal and external data sources. The analyzer or a classifier module for example may perform the categorization. The analyzer or classifier determines which predetermined category or categories each data item should be associated with, based on characteristics of the data item, such as which data source provided the data item (e.g., a credit card company, a bank, etc.), where the item originated (e.g., a charge at a supermarket, a charge at a restaurant, interest income, employment income), etc., for example. The analyzer or classifier may have a list of predetermined categories that each data item may be considered for and classified in. If an existing category cannot be determined for a data item, the analyzer or classifier may prompt the user for a category, and/or may assign the data item to an "unknown" or "other" category, for example. The categories may be used to analyze a user's data, such as monitor a user's finances. For example, categories may be used to monitor where and how much money is being spent by the user, and to help a user understand and adhere to a budget. It is contemplated that a user may consider and amend the categorizations online or in a telephone virtual menu for example.

Figure 5:
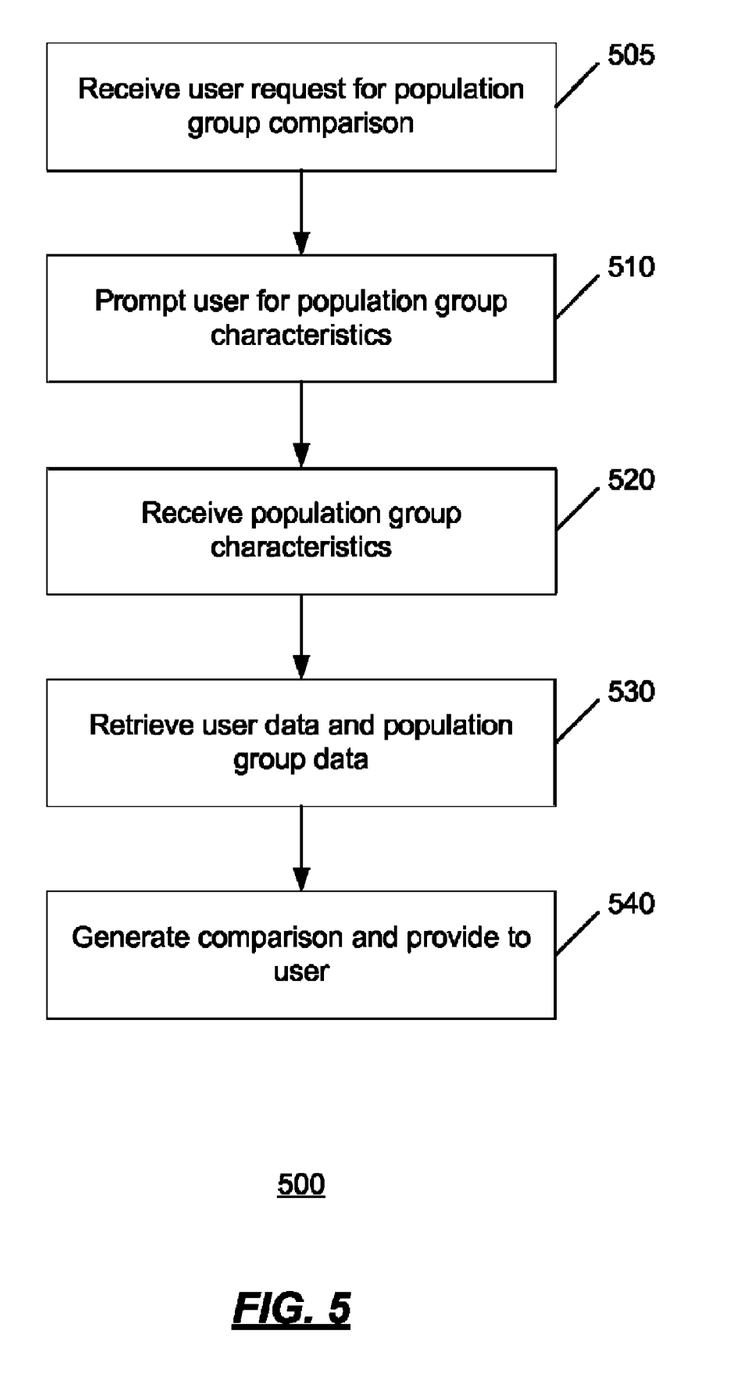
FIG. 5 is an operational flow of an implementation of a financial planning method involving population group comparison.

FIG. 5 is an operational flow of an implementation of a financial planning method 500 involving population group comparison. At operation 505, the institution system may receive a request from a user for a population group comparison. The user may make such a request via a website associated with the institution system or an email to the institution system, for example. A population group comparison allows the user to see how their financial situation compares with people having a particular income level (or income range), age (or age range), marital status, number of children or dependents (or a range), and/or education level, etc., and/or people living in a particular place (e.g., city, state, region of the country, etc.).

At operation 510, the institution system may prompt the user to specify the characteristics of a population group that the user would like to compare his financial situation with. The prompting may be via email or a website for example. In an implementation, a questionnaire may be provided to the user. The questionnaire may ask questions and request responses from the user that are directed to the population group that the user wishes to compare themselves with. The user may specify or select as many population group characteristics as they like, so that they user may compare his financial situation with a very specific population group.

The institution system may receive the population group characteristics from the user at operation 520. In an implementation, a financial planning engine associated with the institution system may receive the population group characteristics, and at operation 530, retrieve data associated with the user and with the users in the selected population group. The data may be retrieved from internal data sources and/or external data sources. Data from various users in the selected population group may be aggregated and analyzed by the financial planning engine.

At operation 540, the institution system may generate a comparison between the user data and the population group data, store the comparison in storage, and provide the comparison to the user by email, fax, a website, or a link to a website, for example. The comparison may include an overview and a report, and may describe or show how certain aspects of a user's financial situation or profile compares to those aspects of the selected population group. For example, the user's savings may be compared to the savings of the selected population group. The comparison may show the average savings of the selected population group, along with other metrics, such as ranges of savings over the entire selected population group. As another example, the amount of insurance (e.g., life, homeowner's, automobile, etc.) that a user has may be compared to the amount of insurance (e.g., average, ranges, etc.) that the selected population group has.

In an implementation, the user may select more than one population group to compare themselves to. In another implementation, the institution system may select one or more population groups for comparison without user selection or interaction. A financial plan that has been generated for the user may be revised based on the population group comparison. In an implementation, financial goals or probabilities of success of reaching the financial goals may be revised, either by the user or by the institution system, in response to the population group comparison.

A comparison of the user's financial situation and one or more population group's financial situation, along with the financial plan, may be sent to the user periodically, such as daily, weekly or monthly, for example, by email, fax, or any other means. In this manner, the user is kept abreast of the current state of the financial plan, their progress towards the goals as set by the financial plan, and how they compare to one or more population groups. This information may also be provided via a website or a link to a website, so that the user may access this information whenever the user would like, in real-time for example.

Any data described herein that may be stored, such as the financial plan, recommendations and results of comparisons, calculations, and analyses for example, may be viewed online by a user for a predetermined time period (e.g., six months after initially being prepared and presented). The saved data may be downloadable to a user for personal use in a format of their choice, such as XML (extensible markup language), a spreadsheet, or a PDF (portable document format) document, for example. Also, for example, a graphical display may be provided, such as a pie chart or linear graph, which may be viewed and downloaded by a user.

Exemplary Computing Arrangement

Figure 6:
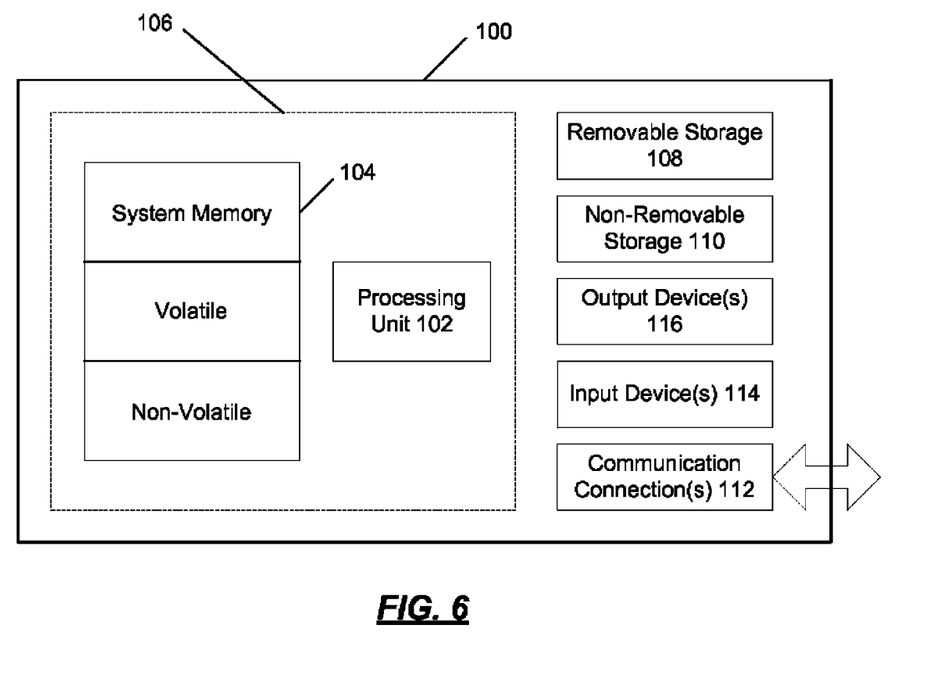
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A financial planning method, comprising:
   receiving at a financial planning engine of an institution system a plurality of financial goals from a user via an email or a website;
   receiving at the financial planning engine from the user a plurality of user-specified financial goal attainment probability inputs, each probability input associated with a different one of the financial goals;
   generating using the financial planning engine a financial plan based on the financial goals and the user-specified financial goal attainment probability inputs, the financial plan comprising a plurality of financial budgeting recommendations to attain each of the financial goals with the associated user-specified financial goal attainment probability inputs; and
   providing the financial plan to the user.

2. The method of claim 1, further comprising electronically receiving data pertaining to the user from a plurality of data sources, at least one of the data sources being internal to an entity that is associated with generating the financial plan and at least one of the data sources being external to the entity.

3. The method of claim 1, further comprising providing a questionnaire to the user requesting the financial goals and receiving the questionnaire from the user with the financial goals.

4. The method of claim 1, further comprising receiving a revision to at least one of the goals from the user and revising the financial plan based on the revision.

5. The method of claim 1, further comprising receiving an update to at least one of the user-specified financial goal attainment probability inputs and revising the financial plan based on the updated user-specified financial goal attainment probability inputs.

6. A computer-readable medium comprising computer-readable instructions for financial planning, said computer-readable instructions comprising instructions that:
   receive a plurality of financial goals from a user via an email or a website;
   receive from the user a plurality of user-specified financial goal attainment probability inputs, each probability input associated with a different one of the financial goals;
   generate a financial plan based on the financial goals and the user-specified financial goal attainment probability inputs, the financial plan comprising a plurality of financial budgeting recommendations to attain each of the financial goals with the associated user-specified financial goal attainment probability inputs; and
   provide the financial plan to the user.

7. The computer-readable medium of claim 6, further comprising instructions that electronically receive data pertaining to the user from a plurality of data sources, at least one of the data sources being internal to an entity that is associated with generating the financial plan and at least one of the data sources being external to the entity.

8. The computer-readable medium of claim 6, further comprising instructions that provide a questionnaire to the user requesting the financial goals and receive the questionnaire from the user with the financial goals.

9. The computer-readable medium of claim 6, further comprising instructions that receive a revision to at least one of the goals from the user and revise the financial plan based on the revision.

10. The computer-readable medium of claim 6, further comprising instructions that receive an update to at least one of the user-specified financial goal attainment probability inputs and revise the financial plan based on the updated user-specified financial goal attainment probability inputs.

11. A financial planning system, comprising:
   at least one subsystem that receives a plurality of financial goals from a user via an email or a website;
   at least one subsystem that receives from the user a plurality of user-specified financial goal attainment probability inputs, each probability input with a different one of the financial goals;
   at least one subsystem including a processor that generates a financial plan based on the financial goals and the user-specified financial goal attainment probability inputs, the financial plan comprising a plurality of financial budgeting recommendations to attain each of the financial goals with the associated user-specified financial goal attainment probability inputs; and at least one subsystem that provides the financial plan to the user.

12. The system of claim 11, further comprising at least one subsystem that electronically receives data pertaining to the user from a plurality of data sources, at least one of the data sources being internal to an entity that is associated with generating the financial plan and at least one of the data sources being external to the entity.

13. The system of claim 11, further comprising at least one subsystem that provides a questionnaire to the user requesting the financial goals and receives the questionnaire from the user with the financial goals.

14. The system of claim 11, further comprising at least one subsystem that receives a revision to at least one of the goals from the user and revises the financial plan based on the revision.

15. The system of claim 11, further comprising at least one subsystem that receives an update to at least one of the user-specified financial goal attainment probability inputs and revises the financial plan based on the updated user-specified financial goal attainment probability inputs.

* * * * *